March 27, 1962 W. H. TANKE 3,026,944
IMPLEMENT MOUNTING ARRANGEMENT
Filed Oct. 6, 1958 3 Sheets-Sheet 1
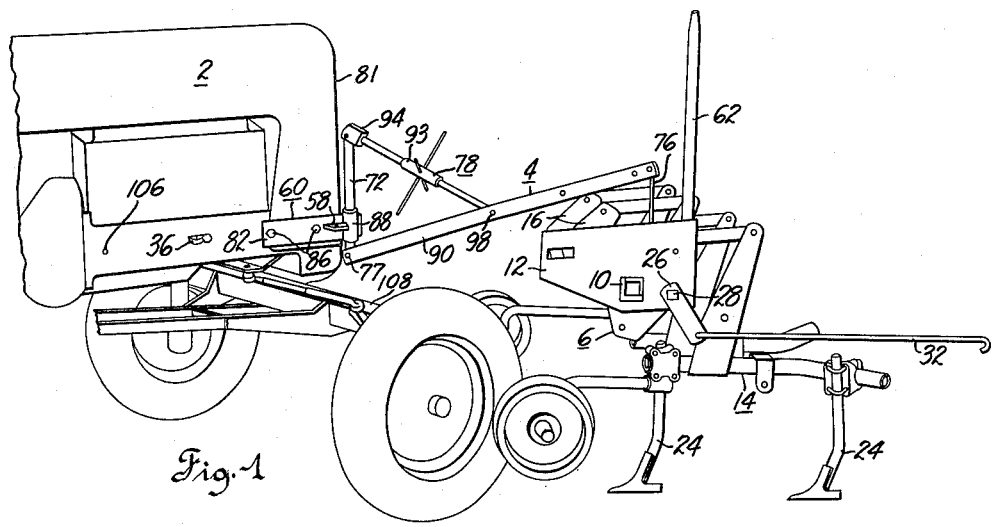
Fig. 1
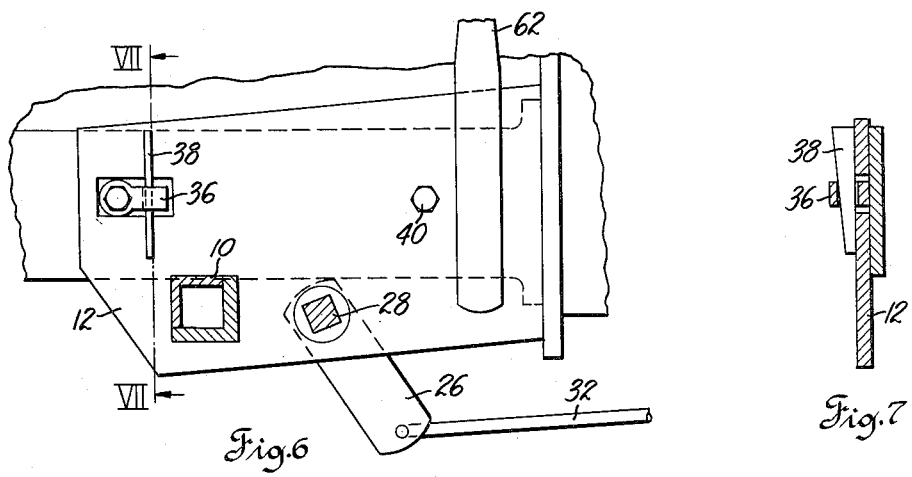
Fig. 6
Fig. 7
Inventor
Willard H. Tanke
By Howard B. Scheckman
Attorney Inventor
Willard H. Tanke
by Howard R. Scheckman
Attorney March 27, 1962 W. H. TANKE 3,026,944
IMPLEMENT MOUNTING ARRANGEMENT
Filed Oct. 6, 1958 3 Sheets-Sheet 3

Inventor
Willard H. Tanke
by Howard B. Scheckman
Attorney

United States Patent Office 3,026,944
Patented Mar. 27, 1962

3,026,944
IMPLEMENT MOUNTING ARRANGEMENT
Willard H. Tanke, La Crosse, Wis., assignor to Allis-Chalmers Manufacturing Company, Milwaukee, Wis.
Filed Oct. 6, 1958, Ser. No. 765,536
10 Claims. (Cl. 172—273)

This invention relates generally to agriculture and more particularly to means for facilitating mounting and removing of heavy implements relative to a tractor.

Many implements have been designed with a view to lessening the time and effort required for mounting and removing the implement relative to a tractor. Prior designs have been generally successful when applied to two row cultivators, see for example my copending U.S. application Serial No. 718,515.

However, in the case of heavy implements, such as four row cultivators, it is very difficult to mount and remove the implement relative to the tractor. A solution to this problem has been the drive in type cultivator (e.g. U.S. Patent No. 2,423,148). However, this has not proved completely popular.

The reason a drive in type cultivator has not proved completely popular is because it weighs 700 pounds or more, is bulky, usually requires two men to manipulate it, takes a great deal of space when it is off the tractor, and cannot be easily applied to a tractor having a wide front axle.

It is an object of my invention to provide an arrangement which facilitates mounting and removing of a heavy implement relative to a tractor.

It is another object of this invention to provide an arrangement which permits mounting a heavy implement on a tractor having either a tricycle type or a wide type front axle.

Other objects and advantages will appear from the following description considered in conjunction with the accompanying drawings, in which:

FIG. 1 is a view showing the position of the implement frame and boom in relation to the wide front axle of the tractor;

FIG. 6 is an enlarged detailed view of the implement frame attaching plate disclosed in FIG. 2; and FIG. 7 is a sectional view of FIG. 6 taken in the direction of arrows VII—VII showing the wedge means for connecting the attaching plate to the tractor.

Essentially my invention comprises (FIG. 1) providing a novel combination of a tractor 2, a boom 4 carried by the tractor, and an implement frame 6 which cooperates with both the boom and the tractor so it may be carried by the boom and easily mounted or removed, or placed on the ground in front of the tractor, leaving a free path for the tractor to move away from the implement frame.

The Implement

Referring specifically to the drawings, the implement (FIGS. 2 and 3) is illustrated as a multirow cultivator. The cultivator is made in two sections or implement frames 6 (only one section being shown). The sections are mounted on opposite sides of the tractor and extend laterally therefrom. Only one of the sections will be described, since the sections are right and left hand duplicates, and the attaching mechanisms for mounting them on the tractor are also substantial duplicates.

Figure 3:
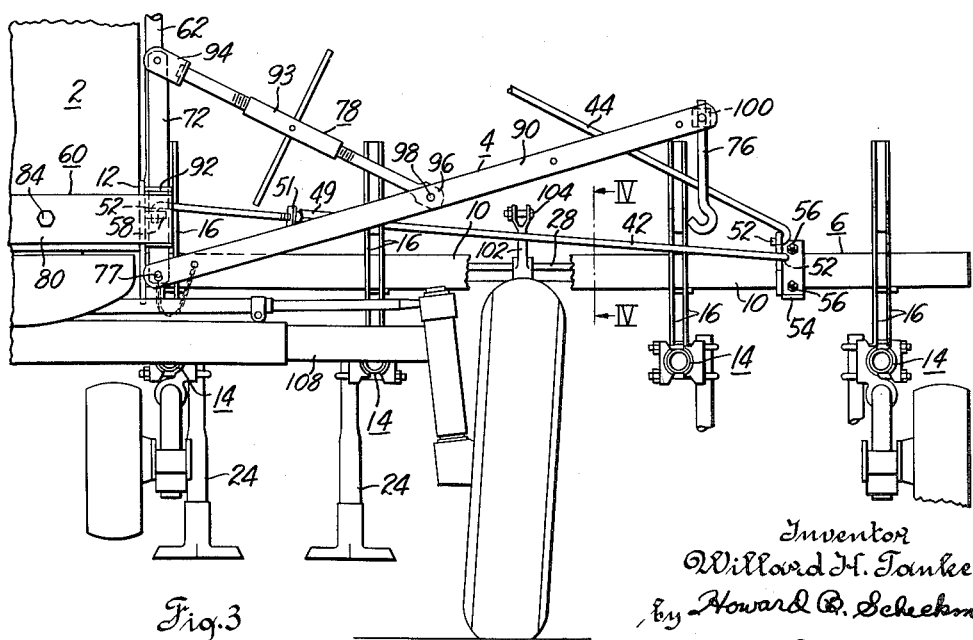
FIG. 3 is a front view of FIG. 2 with certain sections removed to show the lift member which raises the implement frame tools, and also showing the connection of the boom to the front of the tractor.
Figure 5:
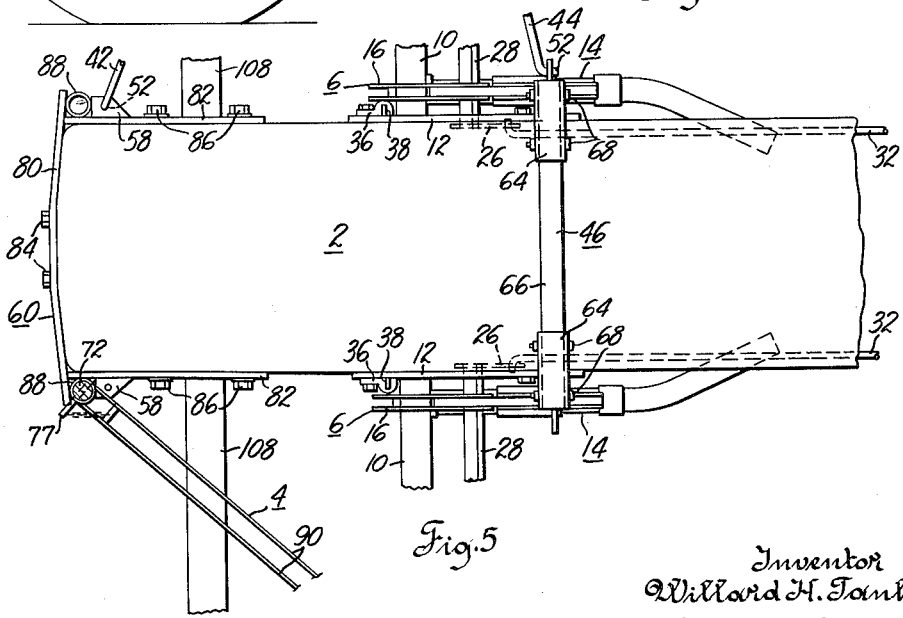
FIG. 5 is a plan view of FIG. 2 showing the truss arch and the U-shaped anchor.

Each implement frame includes (FIGS. 5 and 6) a transversely extending draft bar 10, plate 12, tools 14, and cam arrangement 26, 28 and 30. Draft bar 10 is rigidly secured as by welding to vertically extending attaching plate 12. The draft bar carries a number of tool gangs 14 (FIG. 3).

Each tool gang 14 includes: frame plate 16 (FIGS. 2 and 4) connected to draft bar 10, a pair of parallel links 18, 20 pivotally connected to frame plate 16, a standard 22 carried by the parallel links, tools 24 supported by standard 22, and a depth stop arrangement 25.

Figure 2:
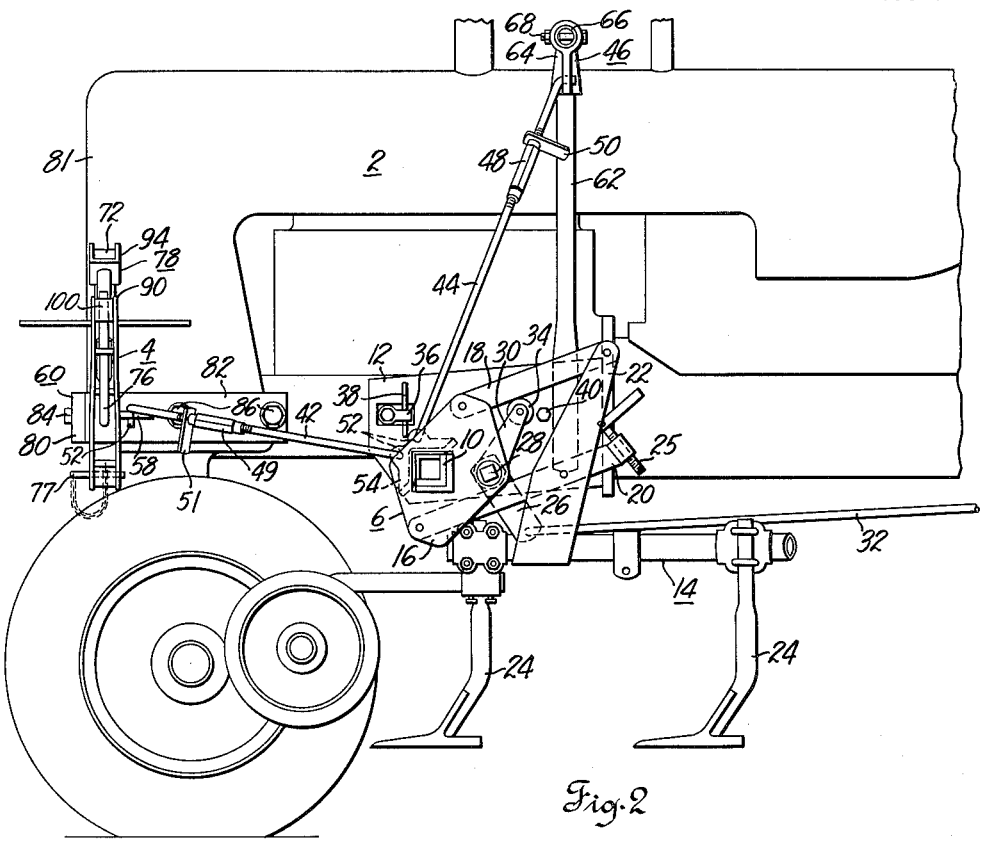
FIG. 2 is a side view of a tractor with an implement frame mounted thereon.

Parallel links 18, 20 and tools 24 are raised and lowered by the cam arrangement which comprises (FIG. 2) lever 26, lift shaft 28 and cam 30. Lever 26 is supported for rotation in attaching plate 12 (FIG. 6). A link 32 (FIGS. 2 and 6) connects lever 26 to the lift arms (not shown) of tractor 2. When the lift arms are raised or lowered, lever 26 is in turn rotated. Connected to lever 26 is square lift shaft 28 (FIGS. 5 and 6) which is rotatably supported by attaching plate 12 and frame plates 16 (FIG. 3). A cam 30 is provided for each gang and is connected to lift shaft 28. Cam 30 has a roller 34 (FIG. 2) at its end and is rotated by lift shaft 28 against upper link 18 to raise standard 22 and the tools 24. Tools 24 are lowered by rotating lever 26 clockwise (FIG. 2).

Means to Connect Implement Frame to Tractor

Means are provided to releasably connect the implement frame to the side or middle of the tractor, and comprises (FIG. 6) locking lug 36 including wedge 38 (FIG. 7) and bolt 40 (FIG. 6) for connecting attaching plate 12 to the tractor; and front and rear braces 42, 44 (FIG. 2) and a truss arch 46 (FIG. 5) for supporting the draft bar.

Attaching plate 12 is apertured (FIG. 1) to receive locking lug 36 and bolt 40. Locking lug 36 receives wedge pin 38 which cooperates with bolt 40 to releasably secure the forward and rearward portions of attaching plate 12 to the middle of the tractor.

Front and rear braces 42, 44 (FIGS. 2, 3) are provided to strengthen draft bar 10 in two different planes to maintain the implement frame in its proper position. Front or first brace 42 reinforces draft bar 10 against being displaced rearwardly. Rear or second brace 44 reinforces draft bar 10 against being deflected downwardly under the weight of the attached tools 24.

Front brace 42 (FIG. 2) is arranged horizontally and connected between tractor 2 and implement frame 10. Rear brace 44 extends vertically and is connected between truss arch 46 and implement frame 10.

Means are provided to removably connect each of said braces to said tractor, truss arch, and implement frame, and comprises a turnbuckle and hook arrangement. Each brace is made into two sections which are threaded and connected together forming turnbuckles 48, 49 (FIG. 2) respectively. Turnbuckles 48, 49 are locked in position by hand lock nuts 50, 51, respectively in a conventional manner. The opposite ends of each brace are provided with hooks 52 (FIGS. 2 and 3). Draft bar 10 carries a bracket 54 secured by bolts 56 (FIG. 3). One end of each brace 42, 44 is connected to the bracket. The other end of the front brace 42 is received in an opening in a bracket 58 (FIGS. 2, 3 and 5) carried by an anchor 60 which is secured to the front of the tractor. The other end of rear brace 44 is releasably connected to truss arch 46.

Truss arch 46 comprises: a vertical leg 62 (FIGS. 2 and 4) carried by each attaching plate and means connecting said legs. The connecting means comprises a socket 64 (FIG. 5) connected to each leg and a cross bar 66 which joins socket members 64. Legs 62 are flattened at their lower ends (FIG. 6) and rigidly secured, as by welding, to the rearward portion of attaching plates 12. The upper ends of the vertical legs are pointed (FIGS. 1 and 2) and releasably received by sockets 64. The sockets are united by means of the tubular cross bar 66 to which the sockets are fastened by bolts 68. Truss arch 46 can be quickly and easily dismantled and assembled to facilitate mounting and removing of the implement frame relative to the tractor.

The truss arch is located slightly to the rear of the draft bar. This causes rear brace 44 to exert rearward force on draft bar 10 which is resisted by front brace 42. In this way the load on the braces can be more evenly distributed.

*Implement Frame Mounting and Removing Means*

The implement frame mounting and removing means comprises: (FIG. 3) anchor 60, boom 4, means in the form of shaft 72 and pin 77 for connecting boom 4 to anchor 60 for universal movement, means 76 in the form of a hook carried by the end of boom 4 to connect boom 4 to said implement frame for joint movement, and raising and lowering means 78 interconnecting shaft 72 and boom 4 for moving said boom vertically to a desired position.

Another 60 (FIG. 5) is U-shaped and comprises a curved front plate 80 and two spaced apart side arms 82 rigidly welded thereto. Front plate 80 is secured to the tractor front 81 by means of cap screws 84. The rearwardly extending side arms are secured to the side of the tractor by bolts 86. A pair of vertical bearings 88 is rigidly secured, as by welding, to the outer ends of plate member 80 and to side arms 82. Shaft 72 is rotatably received in bearing 88. Apertured lug 58 is rigidly secured, as by welding, to side arms 82 forming the anchoring point for front brace 42.

Boom 4 (FIG. 5) comprises two parallel arms 90, 90 which are identical and are secured in spaced apart relation by means of spacer bushings and bolts (not shown).

Shaft 72 has a bearing washer 92 (FIG. 4) welded to it to support the weight of boom 4. Washer 92 bears against the top of anchor bearing 88 thereby determining the vertical position of shaft 72 relative to anchor 60.

Raising and lowering means 78 (FIG. 3) is a turnbuckle 93 which interconnects the upper end of shaft 72 and boom 4. One end of turnbuckle 93 is fixed to a U-shaped clevis 94 that is pivoted to the upper end of shaft 72. The other end of turnbuckle 93 has an eye 96 that is received by a bolt 98 in boom 4. Adjustment of turnbuckle 93 raises or lowers boom 4 vertically to a desired position.

Means are provided for releasably connecting the boom and implement frame and comprise (FIG. 3) a trunnion 100 connected to the end of the boom which carries hook 76 and a lift member 102 (FIGS. 3 and 4) connected to the implement frame. Lift member 102 is connected to square lift shaft 28 of the implement frame. Lift member 102 (FIG. 3) has its free end bifurcated and is provided with a pin 104 to receive hook member 76 of boom 4.

Lift member 102 is movable axially along square lift shaft 28 of the cultivator. This enables the implement frame to be placed in balanced condition when it is moved by the boom. This also enables the implement frame to be quickly and easily pivoted into position for mounting or dismounting.

Lift member 102 also functions to rotate square lift shafts 28 (FIG. 4) when lift member 102 is raised by boom 4. This automatically raises tools 24 in response to lifting of the boom so that the tools don't drag on the ground. This is important when attaching plate 12 is being mounted on the side of the tractor. If boom 4 (FIG. 1) has to be raised to provide clearance for dragging tools, then attaching plate 12 would not line up with locking lug 36 and threaded opening 106 on the tractor. This is also important when the implement frame is being swung around wide front axle 108 to be placed in front of the tractor. If the tools were to drag this would make it difficult if not impossible to move the implement frame around the axle.

*Operation*

Figure 4:
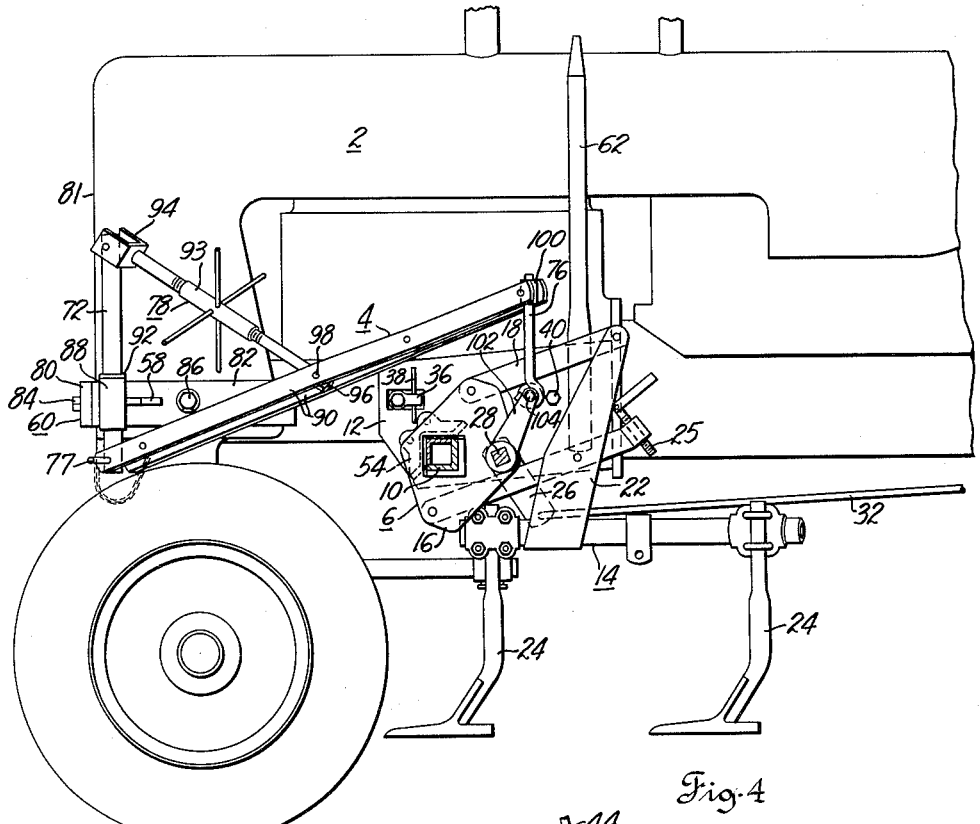
FIG. 4 is a sectional view of FIG. 3 taken in the direction of arrows IV—IV showing the boom connected to the lift member of the cultivator.

Assume that a heavy implement frame is connected to a tractor having a wide front axle, and that the implement frame is to be removed and placed on the ground in a position leaving a free path for the tractor to move away from the implement frame. First, tools 24 are raised off the ground by cam 30, which is operated by the lift arms (not shown) of the tractor. Braces 42 and 44 are disconnected. Boom 4 is then positioned so hook 76 engages lift member 102 (FIG. 4). Truss arch 46, wedge 38 and bolt 40 are disconnected to release the implement frame from the tractor. Boom 4 now supports the implement frame. The implement frame is moved by the boom from a first position in the middle of the tractor, around the wide front axle (FIG. 1) to a second position in front of the tractor where said implement frame can be lowered to the ground, leaving a free path for the tractor. Raising and lowering means 78 is operated to lower implement frame 6 to the ground and then boom 4 is disconnected from the implement frame. In mounting the implement frame 6 relative to the tractor the procedure is reversed.

If it is desired to remove boom 4 from tractor 2, it is only necessary to remove pin 77, that removably connects boom 4 to shaft 72, and raise shaft 72 out of anchor bearing 88.

In summary, my invention provides an arrangement that:

(1) Permits one person to quickly and easily mount or remove a heavy implement relative to a tractor;

(2) Requires less accuracy to position the tractor for mounting of the implement than drive in types, since the boom is able to reach the implement frame with the hook;

(3) Requires less storage space since the implement is much more compact;

(4) Can be removed and placed on the ground in a position that provides a free path so the tractor can back away from the implement; and (5) Can be applied to a tractor having a wide front axle.

Although the invention is shown as used on a tractor having a wide front axle, it can also be used on a tractor having a tricycle type axle.

It should be understood that it is not intended to limit the invention to the herein disclosed form, but that the invenion includes such other forms or modifications as are embraced by the scope of the appended claims.

What is claimed is:

1. In an agricultural machine, the combination comprising: a tractor; an implement frame; means releasably connecting said implement frame to the side of said tractor; an anchor connected to said tractor; a boom; means connecting one end of said boom to said anchor for universal movement; means releasably interconnecting the other end of said boom and said implement frame for joint movement; said anchor positioned on said tractor and constructed to guide the movement of said other end of said boom from a first position in which it supports said implement frame in position for mounting to the side of said tractor, to a second position where said implement frame can be lowered to the ground leaving a free path for said tractor; and, raising and lowering means pivotally interconnected with said boom and said means connecting said boom to said anchor, said raising and lowering means, and said boom forming a brace structure that supports said implement frame when said implement frame is disconnected from the side of said tractor, said raising and lowering means operable to move said other end of said boom vertically to a desired position.

2. In an agricultural machine, the combination comprising: a tractor having a front axle; an implement frame; means releasably connecting said implement frame to the side of said tractor behind said front axle; an anchor connected to the front of said tractor; a boom; means including a shaft releasably connecting one end of said boom to said anchor for universal movement; means releasably interconnecting the other end of said boom and said implement frame for joint movement; said anchor constructed and arranged to guide the movement of said boom from a first position in which said boom supports said implement frame on one side of said front axle in position for mounting to said side of said tractor, to a second position in front of said tractor on the other side of said front axle where said implement frame can be lowered to the ground leaving a free path for said tractor; and, raising and lowering means pivotally interconnecting said boom and said shaft of said means releasably connecting said boom to said anchor, to form a triangular brace structure that supports said implement frame when said implement frame is disconnected from the side of said tractor; said raising and lowering means constructed to move said other end of said boom vertically to a desired position.

3. In an agricultural machine, the combination comprising: a tractor having a front axle; an implement frame carrying tools and including a lift lever interconnected with said tools to raise said tools; means releasably connecting said implement frame to the side of said tractor behind said front axle; an anchor connected to the front of said tractor; a boom; means releasably connecting one end of said boom to said anchor for universal movement; means releasably interconnecting the other end of said boom and said lift lever of said implement frame for joint movement; said lift lever in response to lifting by said boom, raising said tools; said anchor constructed and arranged to guide the movement of said boom from a first position in which said boom supports said implement frame on one side of said front axle in position for mounting to said side of said tractor, to a second position in front of said tractor on the other side of said front axle where said implement frame can be lowered to the ground leaving a free path for said tractor; and, raising and lowering means interconnecting said boom and said means releasably connecting said boom to said anchor, to move said other end of said boom vertically to a desired position.

4. In an agricultural machine, the combination comprising: a tractor having a front axle; an implement frame having a lift shaft extending parallel to said implement frame and a lift lever connected to said lift shaft, said lift lever movable axially along said lift shaft so said lift lever can be positioned at the point of balance of said implement frame; means releasably connecting said implement frame to the side of said tractor behind said front axle; an anchor connected to the front of said tractor; a boom; means releasably connecting one end of said boom to said anchor for universal movement; means releasably interconnecting the other end of said boom and said lift lever of said implement frame for joint movement; said anchor constructed and arranged to guide the movement of said boom from a first position in which said boom supports said implement frame on one side of said front axle in position for mounting to said side of said tractor, to a second position in front of said tractor on the other side of said front axle where said implement frame can be lowered to the ground leaving a free path for said tractor; and, raising and lowering means interconnecting said boom and said means releasably connecting said boom to said anchor, to move said other end of said boom vertically to a desired position.

5. In an agricultural machine, the combination comprising: a tractor having a front axle; an implement frame including an attaching plate; a leg connected to said attaching plate and extending vertically therefrom; means releasably connecting said implement frame to the side of said tractor behind said front axle, including a first brace positioned to support said implement frame against rearward movement relative to said tractor, means removably connecting said first brace to said anchor, means removably connecting said first brace to said implement frame, a second brace positioned to support said implement frame against downward movement relative to said tractor, means removably connecting said second brace to said implement frame, and means removably connecting said second brace to said leg; an anchor connected to the front of said tractor; a boom; means releasably connecting one end of said boom to said anchor for universal movement; means releasably interconnecting the other end of said boom and said implement frame for joint movement; said anchor constructed and arranged to guide the movement of said boom from a first position in which said boom supports said implement frame on one side of said front axle in position for mounting to said side of said tractor, to a second position in front of said tractor on the other side of said front axle where said implement frame can be lowered to the ground leaving a free path for said tractor; and, raising and lowering means interconnecting said boom and said means releasably connecting said boom to said anchor, to move said other end of said boom vertically to a desired position.

6. In an agricultural machine, the combination comprising: a tractor having a front axle; an implement frame; means releasably connecting said implement frame to the side of said tractor behind said front axle; an anchor connected to the front of said tractor, said anchor being provided with a bearing; a boom; means releasably connecting one end of said boom to said anchor for universal movement, said means including a shaft rotatably received in said bearing, a collar carried by said shaft and abutting said bearing to support said shaft, and means pivotally connecting said boom to said shaft; means releasably interconnecting the other end of said boom and said implement frame for joint movement; said anchor constructed and arranged to guide the movement of said boom from a first position in which said boom supports said implement frame on one side of said front axle in position for mounting to said side of said tractor, to a second position in front of said tractor on the other side of said front axle where said implement frame can be lowered to the ground leaving a free path for said tractor; and, raising and lowering means interconnecting said boom and said means releasably connecting said boom to said anchor, to move said other end of said boom vertically to a desired position.

7. A device as set forth in claim 6 wherein said means pivotally connecting said boom to said shaft includes a removable pin received in an opening provided in said boom and in said shaft, said pin cooperating with said collar to prevent removal of said shaft from said bearing in said anchor.

8. A device as set forth in claim 6 wherein said anchor is a U-shaped member whose front is connected to the front of said tractor and whose sides are connected to the sides of said tractor, said anchor carrying a bearing at the intersection of each side of said U with the front of said U, said anchor supporting a shaft on either side of said tractor.

9. In an agricultural machine, a structure for attaching a pair of implement frames to a tractor, comprising: a first implement frame carrying a first leg having one end tapered; means connecting said first implement frame to one side of said tractor with said leg in vertical position; a second implement frame carrying a second leg having one end tapered; means connecting said second implement frame to the other side of said tractor with said leg in vertical position; said tapered ends of said legs facing the same direction; a first member containing a socket; said tapered end of said first leg being inserted in said socket and removably supporting said first member; a second member containing a socket, said tapered end of said second leg being inserted in said socket and removably supporting said second member; and, means rigidly interconnecting said first and second socket members to provide a rigid truss arch for said implement frames.

10. In an agricultural machine, the combination comprising: a tractor; an implement frame; means releasably connecting said implement frame to the side of said tractor; an anchor connected to said tractor; a boom; means movably connecting one end of said boom to said anchor; means releasably interconnecting the other end of said boom and said implement frame for joint movement; raising and lowering means cooperating with said boom to move said entire implement frame vertically to a desired position when said implement frame is disconnected from the side of said tractor; said boom and said raising and lowering means constructed to cooperate and relatively brace each other to support said implement frame when said implement frame is disconnected from the side of said tractor; said anchor positioned on said tractor and constructed to guide the movement of said boom from a first position where said boom and said raising and lowering means support said implement frame in position for mounting to the side of said tractor, to a second position where said implement frame can be lowered to the ground by said raising and lowering means to leave a free path for said tractor.

References Cited in the file of this patent

UNITED STATES PATENTS

| | | |
|---|---|---|
| 983,382 | Mahan | Feb. 7, 1911 |
| 1,055,913 | Howell | Mar. 11, 1913 |
| 1,354,654 | Johnston et al. | Oct. 5, 1920 |
| 1,879,787 | Bohmker | Sept. 27, 1932 |
| 2,505,280 | Ellinghuysen | Apr. 25, 1950 |
| 2,512,733 | Andersen et al. | June 27, 1950 |
| 2,631,513 | Silver et al. | Mar. 17, 1953 |
| 2,928,481 | Gillette et al. | Mar. 15, 1960 |

FOREIGN PATENTS

| | | |
|---|---|---|
| 546,840 | Canada | Oct. 1, 1957 |